March 29, 1966  E. R. CUNNINGHAM  3,243,617
DYNAMOELECTRIC MACHINE
Filed Jan. 2, 1963
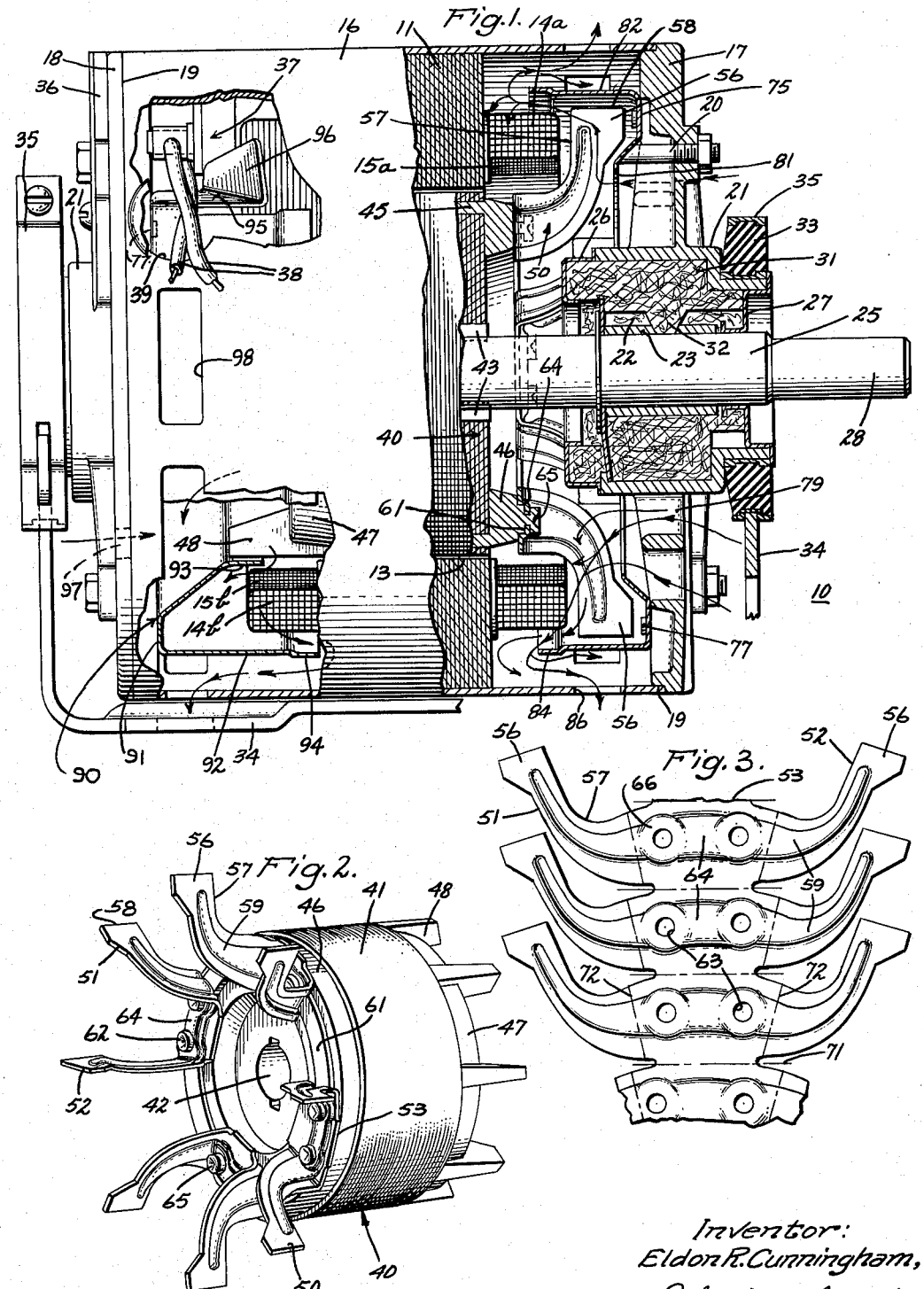
Inventor:
Eldon R. Cunningham,
by John M. Stoudt
Attorney.

United States Patent Office 3,243,617
Patented Mar. 29, 1966

3,243,617
DYNAMOELECTRIC MACHINE
Eldon R. Cunningham, Fort Wayne, Ind., assignor to General Electric Company, a corporation of New York
Filed Jan. 2, 1963, Ser. No. 249,083
9 Claims. (Cl. 310—63)

The present invention relates generally to dynamoelectric machines, and in particular to an improved rotor assembly and ventilation arrangement for transferring the heat away from the main heat generating internal components, such as stator winding end turns of small electric motors and the like, to cool the same in a positive and efficient manner.

It is a general object of the present invention to provide an improved arrangement for removing heat from the main heat generating dynamoelectric machine components, and a more specific object of the invention is the provision of an improved ventilation arrangement, especially suitable for use in partially enclosed electric motors of the drip-proof or splash-proof type.

It is another object of the invention to provide an improved motor ventilation system which attains a high rate of heat transfer from the operating parts of the machine, especially the stator winding end turns, by improving the air flow characteristics over the sides of the stator.

It is yet another object of the invention to provide an improved yet inexpensive rotor having at least one impeller formed of individual low cost components which are easily fabricated and readily installed.

Still another object of the invention is the provision of an improved, yet low cost rotor assembly having a cast winding and at least one impeller defined by a number of individual fan blades in which the blades are capable of being mass produced and accurately positioned on the rotor while permitting the formation of a rotor winding having improved uniform density characteristics.

In carrying out the object in one form, I provide an improved rotor assembly for cooling the heat generating components in dynamoelectric machines, such as the exposed end turns of the stator windings and the end faces of the stator. The assembly includes a magnetic core which carries a cast squirrel-cage type secondary winding having a conductor short-circuiting end ring disposed at each end of the core. A fluid moving impeller is arranged at the respective ends of the core, with at least one of the impellers being defined by a number of generally U-shaped members secured to the end ring for forcing coolant; e.g., air, into intimate contact with the end turns. These members, stamped from relatively thin sheet metal material, are each formed with a pair of spaced apart air moving blade sections, which project radially and axially away from the end ring, preferably terminating in exit portions disposed adjacent the outer periphery of the stator winding end turns. The bight section of each member, joining the two blade sections together, is fixedly secured to rotate with the core on a raised annular portion cast integral with the face of the winding end ring.

This arrangement not only accurately locates the blade sections at substantially the same radial distance from the rotor axis, but in addition the blade sections are easily fabricated and readily installed with a minimum of expense. Moreover, improved winding casting practices are permitted and an effective ventilation of the operating parts of the machine is afforded.

By a further aspect of the invention, a fluid guiding or ventilation arrangement is provided in the dynamoelectric machine which is especially advantageous when employed with the rotor assembly just described, the arrangement being effective for efficient cooling of the heat generating component and for achieving a drip-proof or splash-proof machine construction. In one form, the rotor assembly, which includes an impeller in each end, has only one of the impellers formed by enlarged blade sections. The motor frame, which surrounds the stator, is furnished with separate intake and exhaust openings and a fluid guiding baffle is disposed in the vicinity of the rotor impeller blades at each end of the machine for directing coolant from the intake openings to the impeller blades, into intimate contact with the winding end turns, and then to the ambient through the exhaust openings.

At the end of the machine which includes the enlarged blade sections, the baffle, preferably stamped from sheet material into a somewhat annular form, is provided with an internal surface, facing the stator, generally conforming in configuration to the edge of the exit portions of the impeller blade sections to furnish a low friction diffuser. At the other end of the machine, a switch is arranged within the frame, adjacent the stator, and the fluid guiding baffle has a circumferential length somewhat less than 360° to accommodate the switch. One end of the baffle is bent over to form a channel extending inwardly from a lead-in wire access hole of the machine frame toward the switch, the channel accommodating the lead-in wires which connect the switch to an external power source. The outermost portions of each baffle are positioned between the exhaust openings and the winding end turns, with the edge of the baffles projecting toward the stator formed with a raised rim for preventing water or the like from entering the machine interior, thus making the machine a drip-proof construction.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIG. 1 is a side view, partially broken away and partially in section, of a dynamoelectric machine embodying the preferred form of my invention;

FIG. 2 is a view in perspective of the rotor shown in FIG. 1 to illustrate details; and FIG. 3 is an enlarged view showing several of the rotor blades illustrated in FIG. 2 being fabricated.

Referring now to the drawing in more detail, for purposes of disclosure, the preferred embodiment of my invention is shown incorporated in an alternating current single phase induction split phase motor 10 having a motor enclosure of the open "drip-proof" variety. The motor includes a conventional stator 11 having a magnetic core formed of a stack of secured together laminations carrying excitation windings radially outward of a rotor receiving bore 13. The illustrated windings include main winding, adapted to be energized during motor operation, and an auxiliary or start winding, energized only during starting conditions in the customary fashion. The main winding has end turns 14a, b projecting axially beyond the respective sides of the stator core, with end turns 15a, b of the start winding conventionally positioned radially inward of the main winding. The stator is mounted within a cylindrical central frame or shell 16, which extends beyond the end turns on either side of the stator. Generally identically constructed end frames or end shields 17, 18, are disposed at the ends of shell 16 and may be secured thereto by a rabbeted fit 19 and suitable through-bolts 20 which project entirely through the end frames and stator, adjacent the periphery of the stator, to fasten the motor parts firmly together in assembled relation.

For simplicity and ease of illustration and description, only the right end frame 17 as viewed in FIG. 1 has been shown in detail. Each end frame is cast of suitable material, such as aluminum, and has a central, generally cylindrical bearing housing section 21 formed with conventional inwardly projecting spiders and hub 22 for mounting a sleeve type bearing 23 which rotatably journals shaft 25. Section 21, formed as an integral part of the end frame, serves as a lubricant reservoir for the bearing as well as the means through which the motor may be suitably supported on a stationary structure. Thus, housing section 21 is enclosed at each end by suitable standard oil-cup members 26 and 27 which have central openings to permit passage therethrough of output end 28 of shaft 25 in the case of the right side of the motor. Within the confines of the housing section is disposed lubricant impregnated material 31 for feeding lubricant to the journal surface of bearing 23 through a wick 32 extending radially through hub 22 and the bearing. A resilient mounting ring 33, mounted on section 21 outwardly of oil-cup member 27, is conventionally secured to a generally U-shaped base 34 by straps 35.

It should be observed at this time that other than the construction of end frame 17 which permits output end 28 of shaft 25 to extend axially beyond the confines of the motor, and an opening and cover plate arrangement furnished in the left end frame 18, indicated at numeral 36, the end frames are structurally identical. This latter construction in end frame 18 permits access to a motor controlling switch and terminal board assembly, generally denoted at 37, which may be attached to the inner surface of shell 16 by suitable brackets in the vicinity of the winding end turns to keep the axial length of the motor to a minimum. Assembly 37 may be of the type illustrated and described in U.S. Patent 2,442,227 granted to Glenn D. Willits and assigned to the General Electric Company, assignee of this application. The switch of the assembly is responsive to the speed of rotation of shaft 25 and is actuated by a conventional centrifugal mechanism, not shown, when the motor comes up to speed to deenergize the start winding from the motor circuit. For connecting the motor controlling switch and consequently the motor windings to a suitable power source of alternating current, a pair of leads 38, attached to the terminals of the switch, enter the motor interior through a suitable hole 39 formed in shell 16 near assembly 37.

Turning now to one aspect of the present invention, in the motor of the exemplification I provide a rotor assembly, shown by numeral 40 in FIGS. 1 and 2, which among other features permits economy in its manufacture and achieves improved cooling or a high rate of heat transfer from certain internal motor components; e.g., stator core and winding end turns during motor operation. In the preferred and illustrated embodiment, rotor assembly 40 is constructed with a laminated magnetic core 41 and a squirrel-cage secondary winding for induction operation. The rotor core has a central passageway 42 for receiving shaft 25, the core being affixed to rotate with the shaft by a standard diametrically opposed groove and key structure, referenced in FIG. 1 at 43. The secondary winding, cast of suitable electrical conductive material such as aluminum, comprises angularly spaced apart conductors 45 extending longitudinally through standard slots provided in the core, and a pair of integrally formed end rings 46, 47, one disposed on each side of the core, which join the ends of the conductors together in short-circuited relation. On the end of the rotor located on the same side of the motor as switch and terminal board assembly 37, the end ring includes axially extending impeller blades 48 arranged circumferentially around the end ring for driving the coolant, e.g., air, over the stator core end face and the winding end turns. These blades may be conveniently cast integral with the secondary winding.

The impeller on the right side of the motor, as viewed in FIG. 1, is formed by a number of angularly spaced apart individual, generally U-shaped members 50 of relatively thin cross section (e.g., 0.037 inch) mounted firmly onto end ring 46. More specifically, each member is stamped from suitable material such as steel or aluminum and comprises a pair of spaced apart fan blade sections 51 and 52 and a base or bight section 53 joining blade sections 51, 52 together. Each blade section curves radially and axially outwardly from the bight section, terminating in an enlarged air exit portion 56 at the upper end of the blade section. Thus, inner blade section edges 57 preferably conform to the approximate contour of the winding end turns, with the uppermost edge 58 of exit portion 56 being located at a slightly greater radial distance from the rotor axis than the outermost part of winding end turns 14a. In view of the size of the blade sections, I prefer to includes an arcuate shaped groove or depression 59 from the bight section to exit portion 36 to provide lateral stiffness.

For mounting members 50 onto end ring 46, in the preferred embodiment, I form a raised annular portion 61 on the end ring face, with spaced apart solid studs or projections 62 extending axially away from the end ring. These projections are received through complementing holes 63 of bight sections 53, preferably two in number for each member, with the end of each projection being enlarged and riveted or staked against the outer surface of the bight section, as indicated by numeral 65. In addition, I prefer to furnish a curved groove 64 in the bight section, running between grooves 59 in the respective blade sections 51, 52, for accommodating or fitting over annular portion 61 of end ring 46. If desired, bosses 66 may be formed around each hole 63 to furnish a spring action during the riveting operation for insuring a tight connection between the parts.

In the foregoing mounting construction, it will be seen from FIGS. 1 and 2 that raised annular portion 61 of the end ring and grooves 64 in the bight sections accurately locate each member 50 at approximately the same linear distance from the rotor axis or center of rotation. Moreover, projections 62 along with the other component parts assume the correct angular position of each blade section, which in their assembled positions on end ring 46 are equally spaced apart with their air moving surfaces of portions disposed in planes substantially radial with respect to the rotor axis and approximately perpendicular relative to the rotor end face thereby allowing their use in motors having circuitry for achieving reverse rotation.

Manufacturing benefits and advantages, in addition to those already set out, which are directly attributable to the preferred rotor construction of my invention, will be considered before explaining the manner in which rotor assembly 40 is employed in the illustrated ventilating system of motor 10 and the operative features of the rotor and ventilating system.

For instance even though members 50, when secured to end ring 46, have their blade exits disposed at an unusually large radial distance from the rotor axis, they are inexpensive to produce, both from the standpoint of material utilization and fabrication. In this regard, members 50 lend themselves to rapid automatic, mass production procedures. As shown in FIG. 3, the members may be conveniently stamped in a row into the desired configuration out of a coil of strip material with the use of commercially available punch press, self-feeding progressive die equipment. The material, once severed along the solid lines and broken lines 71 to separate the strip into individual pieces, may be bent upwardly along broken lines 72 until the blade sections 51, 52 and bight sections 53 assume the relative positions shown in FIGS. 1 and 2. The punch press which severed the material may be used for this forming operation.

The members are installed directly onto annular portion 61 of end ring 46 in the manner previously described after the secondary winding has been formed on core 41, and the core has been assembled onto shaft 25. This installation may be accomplished just prior to the assembly of the rotor into the motor 10 so that possible injury to the enlarged blades or to the individuals handling the rotors will be minimized. Although blade sections 51, 52 of members 50 are in effect inseparable yet enlarged parts of the rotor assembly, but are not cast integral with end ring 46, it is possible to follow well known casting procedures to form a rotor winding of substantially void free, uniformly dense material with good electrical characteristics for the conductors and end rings. This may be readily achieved even with the provision of integral blades 48 at one end of the rotor assembly and raised annular portions 61 and projections 62 at the other end.

Referring now specifically to the ventilation system for motor 10 of the exemplification, I mount air guiding means at each end of the motor as seen in FIG. 1. With respect to the right side of the motor which has the enlarged impeller formed by members 50, I furnish an annular member 75 in spaced relation with blade exit portions 56 to form a low friction vaneless type diffuser for the impeller as it rotates. Member 75, made of sheet metal material, is fixedly attached, as by integral rivets 77 or the like, to the interior of end frame 17, outwardly of bearing housing section 21 and suitable air intake openings 79 provided next to the bearing housing. In its illustrated form, member 75 is somewhat cup-shaped providing a diffuser which has an internal surface generally conforming to the outer contour of the edge of blade exit portions 56. It is thus provided with a frusto-conical flange section 81 having its inner margin defining an aperture in communication with intake openings 79, and with an outer cylindrical section 82, which projects toward the stator and terminates in an offset rim 84 bent outward from but disposed directly over a part of end turns 15a and spaced therefrom a relatively small amount. Rim 84 is preferably located toward stator 11, axially beyond exhaust openings 86 furnished in shell 16 near the end thereof. Thus, offset rim causes the air velocity to be highest at this portion of the flow path due to the converging path it defines with the end turns and prevents moisture which might enter the motor through openings 79 and 86 from running axially toward the stator winding. The moisture will run circumferentially around cylindrical section 82 and drop out of the shell through exhaust openings 86 at the lowest point of the motor.

Consequently, in the right hand side of motor 10 during operation, coolant or air will be drawn into the motor interior through intake opening 79 by reason of blade sections 51, 52 (as indicated by the arrows) and forced in intimate contact with the stator core and end turns 14a, 15a as air is caused to travel through the diffuser part of the flow channel. The relatively thin cross section of the impeller blade sections 51, 52 augment this action. The air leaves the diffuser at high velocity and is directed toward the stator core side face where it is forced to turn 180°, passing between shell 16 and baffle section 82. The air finally leaves the motor through exhaust openings 86. This path sweeps away the normally hot air usually surrounding the outer surface of the end turns to cool the end turns and stator core by increased turbulence in this area. The radial clearances between winding end turns 14a, 15a and the internal surface of member 75; e.g., at rim 84, may be selected to provide a maximum cooling effect.

It will be recalled from the preceding description that in the left hand side of the motor of the exemplification as viewed in FIG. 1, a motor controlling switch and terminal board assembly 37 is arranged adjacent winding end turns 14b, 15b and cooperates with a centrifugal mechanism attached to rotate with shaft 25. In addition, the impeller for this side of the motor, provided by blades 48, does not project radially and axially outward from the rotor core as do blade sections 51, 52 of members 50. In order to obtain a drip-proof and fluid directing construction for this side of the motor, I furnish a baffle member 90, generally U-shaped in cross section, having outer and inner cylindrical sectors 92 and 93 respectively joined by radial sector 91, with the outer sector terminating in an offset rim 94 for the same reasons as those previously explained with respect to rim 84 of baffle member 75. Like the other side of the motor, end frame 18 may include integral rivets 77 to mount baffle 90 next to end turns 14b, 15. In addition, intake and exhaust openings 97, 98 respectively, are provided in substantially the same relation to baffle 90 as the corresponding openings and baffle in the right side of the motor.

With reference to the preferred form of member 90, it has a total circumferential length somewhat less than 360°, in the order of 300° in the embodiment, to accommodate a part of the switch and terminal board assembly 37, partially shown in FIG. 1. One circumferential end of baffle is arranged adjacent lead-in wire hole 39. The free end of section 91 extends beyond sections 92 and 93 and is bent over axially and then radially to form walls 95 and 96. The walls together define a channel to guide insulated lead-in wires 38 from hole 39 to assembly 37 and to insure a physical separation of these wires from the rotor blades and other wires. Moreover, walls 95 and 96 serve to prevent water, which may enter the motor through hole 39, from penetrating beyond the confines of baffle 90. These functions are provided by baffle 90 without unnecessarily interfering with the circulation of coolant over the outer surface of winding end turns 14b and 15b. The other circumferential end of the baffle sectors terminate in a lateral edge of uniform axial length. Preferably intake and exhaust openings 97, 98 are provided in the motor frame within the circumferential limits defined by the circumferential length and position of outer sector 92 so that a drip-proof structure is insured. The air flow pattern for the left side of the motor is clearly revealed by the arrows.

The advantageous and desirable features of the present invention should be readily manifest from the foregoing description. In one aspect, an improved rotor assembly is provided having enlarged blade sections which are easily mass produced and accurately positioned on the rotor assembly while permitting the formation of a rotor winding having good uniform density characteristics. In addition, blade sections are easily fabricated and readily installed on the rotor at low cost, yet provide improved cooling performance when employed in dynamoelectric machines. The invention also provides an improved ventilation arrangement which not only affords an unusually good drip-proof machine construction but also permits the mounting of a motor controlling switch next to the winding end turns to allow a reduction in the axial length of the machine, if so desired.

While in accordance with the patent statutes, I have described what at present is considered to be the preferred embodiment of my invention, it will be obvious to those skilled in the art that numerous changes and modifications may be made therein without departing from the invention. For example, communication between the two ends of the motor, such as by the provision of well known axially extending cooling ducts formed entirely through the rotor laminations, may be included. In addition, if desired, the arrangement described for the right side of the motor shown in FIG. 1 may be employed for both sides of the motor when the motor does not have controlling switch assemblies mounted next to the stator windings in the manner set out in the present exemplification. It is therefore aimed in the appended claims to cover all equivalent variations as fall within the true spirit and scope of the invention.

What I claim as new and desire to secure by Letters Patent of the United States is:

1. A rotor assembly for use in a dynamoelectric machine comprising a core formed of magnetic material having a number of angularly spaced apart conductor receiving slots projecting longitudinally through the core, a cast winding of electrically conductive material including conductors accommodated in said slots and a circumferential end ring integrally joined to said conductors at each end of the rotor in short circuiting relation therewith, and an impeller for moving fluid formed by a plurality of separate members formed of sheet material individually mounted on at least one end ring of said winding, said members each having a base section and at least one air moving blade section projecting radially and axially away from said base section, the end ring associated with said members including a raised annular portion integrally formed on its face with each base section of said members having a groove fitting onto said raised annular end ring portion for locating each of said members at substantially the same radial distance from the rotor axis, and means for securing each base section firmly onto said raised annular end ring portion whereby each member is fixedly secured thereto at substantially the same radial distance from the rotor axis.

2. A rotor assembly for use in a dynamoelectric machine comprising a core formed of magnetic material having a number of angularly spaced apart conductor receiving slots projecting longitudinally through the core, a cast winding of electrically conductive material including conductors accommodated in said slots and a circumferential end ring integrally joined to said conductors at each end of the rotor in short circuiting relation therewith, and a plurality of generally U-shaped members formed from sheet material individually mounted on at least one end ring for moving cooling fluid during rotation of said assembly, said members each having a pair of spaced apart fluid moving blade sections projecting radially and axially away from said core terminating radially beyond the core periphery, and having a bight section joining said blade sections together, the end ring mounting said U-shaped members being formed with a raised annular portion on its face, said bight section having a groove extending between said blade sections and fitting onto said raised annular end ring portion, said grooves and annular end ring portion together locating the position of each member at substantially the same radial distance from the rotor axis.

3. A rotor assembly for use in a dynamoelectric machine comprising a core formed of magnetic material having a number of angularly spaced apart conductor receiving slots projecting longitudinally through the core adjacent its periphery, a winding of electrically conductive material including conductors accommodated in said slots and a circumferential end ring joining said conductors together at each end of the rotor in short circuiting relation, and an impeller for moving fluid formed by a plurality of generally U-shaped members of sheet material disposed adjacent at least one end ring of said winding, said members each having a pair of spaced apart fluid moving blade sections and a bight section joining said blade sections together, said blade sections projecting radially and axially away from said core and terminating radially beyond said core periphery and means mounting said members in predetermined angularly spaced apart positions adjacent the end ring.

4. A rotor assembly comprising a core formed of magnetic material having a number of angularly spaced apart conductor receiving slots projecting longitudinally through the core, a cast winding of electrically conductive material including conductors accommodated in said slots and a circumferential end ring integrally joined to said conductors at each end of the rotor in short circuiting relation therewith, and a plurality of generally U-shaped members formed from sheet material mounted adjacent at least one end ring for moving cooling fluid during rotation of said assembly, said members each having a pair of air moving blade sections projecting radially and axially away from said core and terminating radially beyond the core periphery and a bight section joining said blade sections together, angularly spaced apart projections extending axially away from said core in predetermined positions around the end ring mounting said U-shaped members, said bight section of each member including openings to accommodate said projections for angularly positioning each of said members adjacent said end ring, the ends of said projections being secured against said bight section to fasten said members rigidly onto said end ring in predetermined angularly spaced apart location entirely around said rotor.

5. A rotor assembly comprising a core formed of magnetic material having a number of angularly spaced apart conductor receiving slots projecting longitudinally through the core, a cast winding of electrically conductive material including conductors accommodated in said slots and a circumferential end ring integrally joined to said conductors at each end of the rotor in short circuiting relation therewith, and an impeller mounted adjacent at least one end of said core including a plurality of angularly spaced apart one piece sheet metal members each having a base section and at least one fluid moving blade section, means securely mounting the base sections of the respective members individually on the associated end ring at substantially the same radial distance from the rotor axis, said mounting means comprising a raised annular portion integrally cast on the face of said associated end ring and integrally cast angularly spaced apart projections extending outwardly from said raised annular portion at predetermined locations, a groove formed in each base section of said members fitting onto said raised annular portion with the projections passing through and being secured against said base section whereby said grooves, raised annular end ring portion, and projections conjointly locate and maintain the respective members in a preselected accurate angular relationship on said associated end ring at substantially the same radial distance from the rotor axis.

6. A dynamoelectric machine comprising a stator including a core of magnetic material accommodating excitation windings having end turns projecting beyond each side of said core, a shaft, frame means enclosing said stator and having bearing means disposed at each end of said stator for journaling said shaft, said frame means further including fluid intake and exhaust openings, a rotor secured to said shaft comprising a core formed of magnetic material having a number of conductor receiving slots projecting longitudinally through the rotor core adjacent its periphery, a secondary winding of electrically conductive material including conductors accommodated in said slots and a circumferential end ring joining said conductors together at each end of the rotor in short circuiting relation, and at least one impeller for moving cooling fluid from the intake openings during operation of the machine into intimate contact with the stator winding end turns and discharging the fluid from the machine through said exhaust opening, said impeller formed by a plurality of angularly spaced apart generally U-shaped members of sheet material mounted adjacent an end ring of said secondary winding and arranged to rotate therewith, said members each having a pair of spaced apart fluid moving blade sections and a bight section joining said blade sections together, said blade sections projecting radially and axially away from said rotor core and terminating in an exit portion having an edge disposed in the vicinity of the outer periphery of said winding end turns, a generally annular somewhat U-shaped fluid guiding baffle secured to said frame means next to and in close proximity with said blade sections, said baffle having a central opening for admitting cooling fluid to said blade sections from said intake openings, with the internal surface of said baffle conforming in contour generally to the outer configuration of the exit portions of said blade sections, the outer end of the baffle extending toward said stator core over the outer edge of the blade exit portions and the outer periphery of the end turns to form a low friction diffuser for the blade sections and to force the cooling fluid into intimate turbulent relation with the stator winding end turns for cooling the same.

7. A dynamoelectric machine comprising a stator including a core of magnetic material accommodating excitation windings having end turns projecting beyond each side of said core, a shaft, frame means enclosing said stator and having bearing means disposed at each end of said stator for journaling said shaft, said frame means further including fluid intake and exhaust openings, a rotor secured to said shaft comprising a core formed of magnetic material having a number of conductor receiving slots projecting longitudinally through the rotor core adjacent its periphery, a secondary winding of electrically conductive material including conductors accommodated in said slots and a circumferential end ring joining said conductors together at each end of the rotor in short circuiting relation, and an impeller disposed at each end of the rotor for moving cooling fluid from the intake openings during operation of the machine into intimate contact with the stator winding end turns and for discharging the fluid from the machine through said exhaust opening, at least one of said impellers being formed by a plurality of angularly spaced apart members of sheet material mounted adjacent an end ring of said secondary winding and arranged to rotate therewith, said members each having at least one fluid moving blade section projecting radially and axially away from said rotor core and terminating in an exit portion having an edge disposed in the vicinity of the outer periphery of said winding end turns, a generally annular cup-shaped fluid guiding baffle arranged next to and in close proximity with said blade sections to provide a diffuser for said sections, said baffle having a central opening for admitting cooling fluid to said blade sections from said intake openings, with the outer rim of the baffle extending toward said stator core, over the outer edge of the blade exit portions and the outer periphery of the end turns, to form a low friction diffuser for the blade sections and to force the cooling fluid into intimate turbulent contact with the stator winding end turns and stator core side for cooling the same.

8. A dynamoelectric machine comprising a stator including a core of magnetic material accommodating excitation windings having end turns projecting beyond each side of said core, a shaft, frame means enclosing said stator and having bearing means disposed at each end of said stator for journaling said shaft, said frame means further including fluid intake and exhaust openings, a rotor secured to said shaft comprising a core formed of magnetic material having a number of conductor receiving slots projecting longitudinally through the rotor core adjacent its periphery, a secondary winding of electrically conductive material including conductors accommodated in said slots and a circumferential end ring joining said conductors together at each end of the rotor in short circuiting relation, and an impeller disposed at one end of the rotor for moving cooling fluid from the intake openings during operation of the machine into intimate contact with the associated stator winding end turns and for discharging the fluid from the machine through said exhaust openings, a cup-shaped fluid guiding baffle of arcuate configuration arranged within said frame means next to and in close proximity with said one impeller, said baffle having a central opening for admitting cooling fluid to the associated impeller from said intake opening and extending less than 360° in circumferential length to form an open space between circumferential ends of said baffle, a machine controlling switch means mounted in said open space angularly between the circumferential ends of said baffle effectively impeding the flow of cooling fluid axially through the baffle at that location, one circumferential end of said baffle being bent over to form a channel for receiving lead-in wires extending from outside the machine to the switch means.

9. A dynamoelectric machine comprising a stator including a core of magnetic material accommodating excitation windings having end turns projecting beyond each side of said core, a shaft, frame means enclosing said stator and having bearing means disposed at each end of said stator for journaling said shaft, said frame means further including fluid intake and exhaust openings, a rotor secured to said shaft comprising a core formed of magnetic material having a number of conductor receiving slots projecting longitudinally through the rotor core adjacent its periphery, a secondary winding of electrically conductive material including conductors accommodated in said slots and a circumferential end ring joining said conductors together at each end of the rotor in short circuiting relation, and first and second impellers disposed respectively at the ends of the rotor for moving cooling fluid from the intake openings during operation of the machine into intimate contact with the stator winding end turns and discharging the fluid from the machine through said exhaust opening, said first impeller formed by a plurality of angularly spaced apart members of sheet material mounted adjacent an end ring of said secondary winding and arranged to rotate therewith, said member each having at least one fluid moving blade section projecting radially and axially away from said rotor core and terminating in an exit portion having an edge disposed in the vicinity of the outer periphery of said winding end turns, a generally annular somewhat cup-shaped fluid guiding baffle disposed next to and in close proximity with said blade sections to provide a diffuser for said first impeller, said baffle having a central opening for admitting cooling fluid to said first impeller from said intake openings, the outer end of the baffle extending toward said stator core over the outer edge of the blade exit portions and the outer periphery of the end turns to form a low friction diffuser for the blade sections and to force the cooling fluid into intimate turbulent relation with the stator winding end turns for cooling the same, a fluid guiding second baffle of arcuate configuration arranged within said frame means next to and in close proximity with said second impeller, said second baffle having a central opening for admitting cooling fluid to said second impeller from said intake openings and extending less than 360° in circumferential length to form an open space between circumferential ends of said baffle, a machine controlling switch means mounted in said open space angularly between the circumferential ends of said second baffle effectively impeding the flow of fluid axially through the second baffle at that location, one circumferential end of said second baffle being bent over to form a channel for receiving lead-in wires extending through said frame from outside the machine toward the switch means, thereby maintaining said lead-in wires away from said second impeller, and whereby said baffles and frame openings make said machine drip-proof and prevent the excessive entrance of moisture toward the machine stator.

References Cited by the Examiner
UNITED STATES PATENTS
1,920,315  8/1930  Myers _____ 310—63

ORIS L. RADER, *Primary Examiner.*

L. L. SMITH, *Assistant Examiner.*